(12) United States Patent
Okamura et al.

(10) Patent No.: US 6,865,929 B2
(45) Date of Patent: Mar. 15, 2005

(54) COMBUSTION STATE DETECTION AND FAILURE DETERMINATION APPARATUS OF AN INTERNAL COMBUSTION ENGINE

(75) Inventors: Koichi Okamura, Tokyo (JP); Hisanori Nobe, Tokyo (JP); Yasuhiro Takahashi, Tokyo (JP); Mitsuru Koiwa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 105 days.

(21) Appl. No.: 10/261,502

(22) Filed: Oct. 2, 2002

(65) Prior Publication Data

US 2003/0196481 A1 Oct. 23, 2003

(30) Foreign Application Priority Data

Apr. 17, 2002 (JP) .................................. P.2002-114706

(51) Int. Cl.⁷ ............................................ G01M 15/00
(52) U.S. Cl. .................. 73/119 R; 73/35.08; 73/117.3; 73/118.1
(58) Field of Search .............................. 73/35.01, 35.03, 73/35.06, 35.07, 35.08, 116, 117.2, 117.3, 118.1

(56) References Cited

U.S. PATENT DOCUMENTS

| | | | | |
|---|---|---|---|---|
| 5,207,200 A | * | 5/1993 | Iwata | 123/406.14 |
| 5,571,245 A | * | 11/1996 | Ooyabu et al. | 123/630 |
| 6,054,859 A | * | 4/2000 | Takahashi et al. | 324/399 |
| 6,118,276 A | * | 9/2000 | Nakata et al. | 324/464 |
| 6,328,016 B1 | * | 12/2001 | Takahashi et al. | 123/406.35 |
| 6,418,785 B1 | * | 7/2002 | Hatazawa et al. | 73/35.08 |
| 6,615,645 B1 | * | 9/2003 | Butler et al. | 73/117.3 |
| 2003/0101797 A1 | * | 6/2003 | Nishimoto et al. | 73/35.01 |

FOREIGN PATENT DOCUMENTS

| | | |
|---|---|---|
| JP | 5-231293 | 9/1993 |
| JP | 5-231293 A | 9/1993 |
| JP | 11-13619 A | 1/1999 |
| JP | 2001-107832 | 4/2001 |

* cited by examiner

*Primary Examiner*—Eric S. McCall
(74) *Attorney, Agent, or Firm*—Sughrue Mion, PLLC

(57) ABSTRACT

Ion current detection signal output section for outputting an ion current detection signal including a failure determination signal of an ignition operation is provided, and a failure determination as well as a combustion state can be performed based on this ion current detection signal.

10 Claims, 8 Drawing Sheets

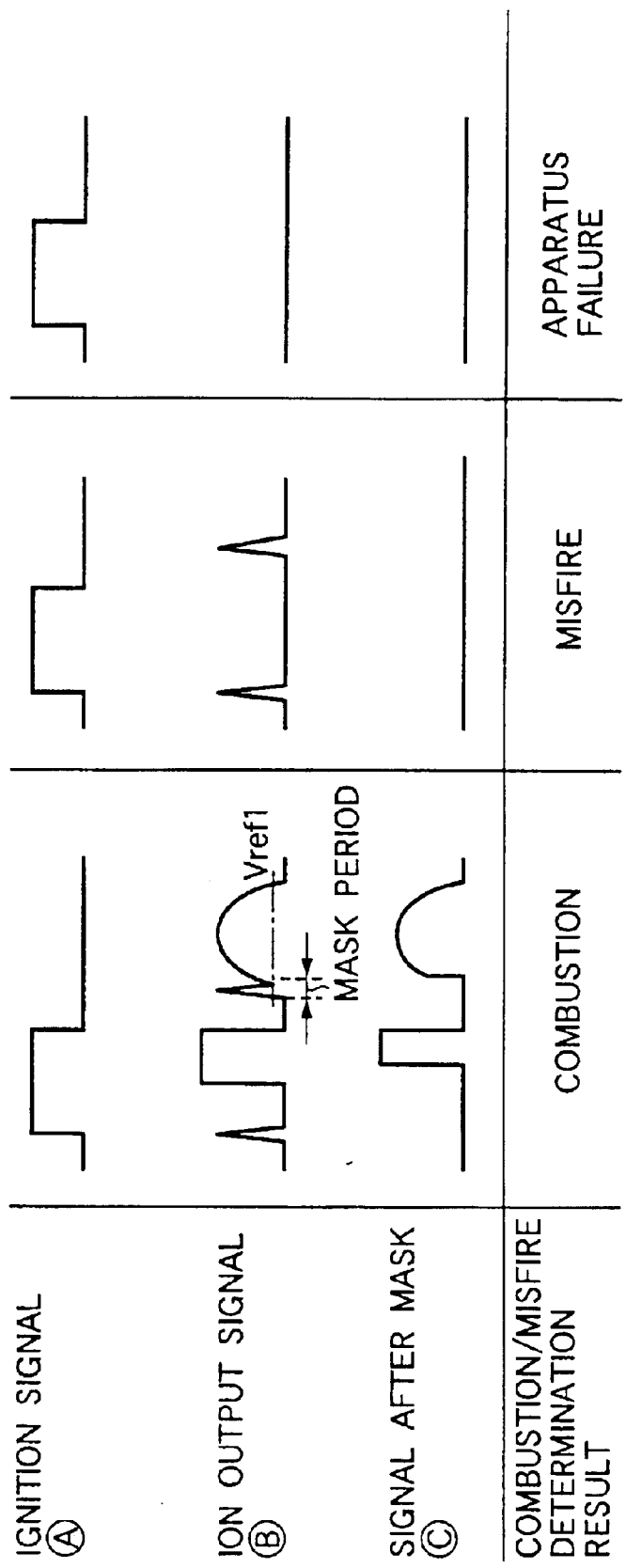

COMBUSTION STATE DETECTION AND FAILURE DETERMINATION APPARATUS OF AN INTERNAL COMBUSTION ENGINE

BACKGROUND OF THE INVENTION

1. Field of the Invention

This invention relates to a combustion state detection apparatus of an internal combustion engine for detecting a combustion state of the internal combustion engine by an ion current flowing as a medium of an ion occurring by combustion in the internal combustion engine.

2. Description of the Related Art

FIG. 7 is a block diagram showing a configuration of an apparatus according to the related art. FIG. 8 is a timing chart showing an operation thereof.

Numeral 1 denotes a control unit.

Numeral 1a denotes an ion current detection circuit for converting an ion current into a voltage value, including a current mirror and a resistor for ion current detection.

Numeral 1b denotes a mask circuit for eliminating a noise signal superimposed on the ion current at the time of turning on an ignition signal and after the completion of discharge.

Numeral 1c denotes combustion/misfire determination section for comparing a signal after mask with a predetermined reference level (Vref1) and making a combustion determination when the signal is larger than the reference level or making a misfire determination when the signal is smaller than the reference level.

Numeral 1d denotes an ignition signal generation section.

Numeral 2 denotes an ignition coil.

Numeral 2a denotes a primary winding of the ignition coil.

Numeral 2b denotes a secondary winding of the ignition coil.

Numeral 2c denotes a drive circuit including a preamplifier and a switching element.

Numeral 2d denotes a bias circuit including a capacitor for storing a bias voltage for ion current detection, a Zener diode for defining a bias voltage value and a diode for forming a secondary current path.

Numeral 3 denotes a spark plug.

By an ignition signal (signal A) outputted by the ignition signal generation section, the drive circuit energizes and breaks a primary current flowing through a primary winding of the ignition coil. At a time of the break, a high voltage occurs in a secondary winding of the ignition coil and a discharge is performed between electrodes of the spark plug and combustion of mixed gas inside a cylinder (not shown) is performed. The capacitor inside the bias circuit is charged by a secondary current flowing through a secondary winding during the discharge, and this charge voltage is applied to the spark plug after the completion of the discharge, and an ion current flows using an ion occurring by the combustion as a medium. This ion current is converted into a voltage by the ion current detection circuit in the control unit (signal B), and noise occurring at the time of turning on the ignition signal and after the completion of the discharge is eliminated by the mask circuit (signal C), and the combustion/misfire determination section makes a combustion determination when a signal level after mask is larger than a predetermined level (Vref1), or makes a misfire determination when the signal level is smaller than the level.

At a time-of combustion, a signal after mask at the time of misfire is indicated as shown in FIG. 8 and it can be determined whether or not the mixed gas has burned, but in the case of the misfire, a failure cause bringing about the misfire and a failure part cannot be identified. Also, in the case of failure of a detection system (ex. a break in wiring between the bias circuit and the ion current detection circuit), the signal after mask becomes equal to that at the time of the misfire. Because of this, when misfire detection is performed by the conventional apparatus and a misfire determination is made, there is a problem that it is necessary to inspect all the parts and detection systems having the possibility of causing the misfire for the purpose of repair and the number of man-hours of the repair is large.

SUMMARY OF THE INVENTION

In the present application, a combustion state detection apparatus of an internal combustion engine for identifying a failure part and reducing the number of man-hours of repair is provided.

According to a first aspect of the invention, there is provided a combustion state detection apparatus including an ignition coil, an ignition coil primary current switching section, an ion current detection section, a failure determination signal output section, an ion current detection signal output section, a combustion state detection section, and a failure determination section. The ion current detection section detects an ion current. The failure determination signal output section outputs a failure determination signal of an ignition operation. The ion current detection signal output section outputs an ion current detection signal including the ion current and the failure determination signal. The combustion state detection section detects a combustion state of an internal combustion engine based on the ion current detection signal. The failure determination section determines failure of the ignition coil based on the ion current detection signal.

According to a second aspect of the invention, there is provided a combustion state detection apparatus including an ignition coil, an ignition coil primary current switching section, an ion current detection section, a failure determination signal output section, an ion current detection signal, a second failure determination signal output section, a combustion state detection section, a failure determination section, and a second failure determination section. The ion current detection section detects an ion current. The failure determination signal output section outputs a failure determination signal of an ignition operation. The ion current detection signal output section outputs an ion current detection signal including the ion current and the failure determination signal. The second failure determination signal output section outputs a second failure determination signal of an ignition operation. The combustion state detection section detects a combustion state of an internal combustion engine based on the ion current detection signal. The failure determination section determines failure of the ignition coil based on the ion current detection signal. The second failure determination section determines failure of the ignition coil based on the second failure determination signal.

According to the invention, since failure parts can be identified or limited, there is shown a practically remarkable effect capable of reducing number of man-hours of inspection items in a case of making repairs.

BRIEF DESCRIPTION OF THE DRAWINGS

FIG. 8 is a timing chart showing the conventional apparatus.

DETAILED DESCRIPTION OF THE PREFERRED EMBODIMENTS

First Embodiment

Figure 1:
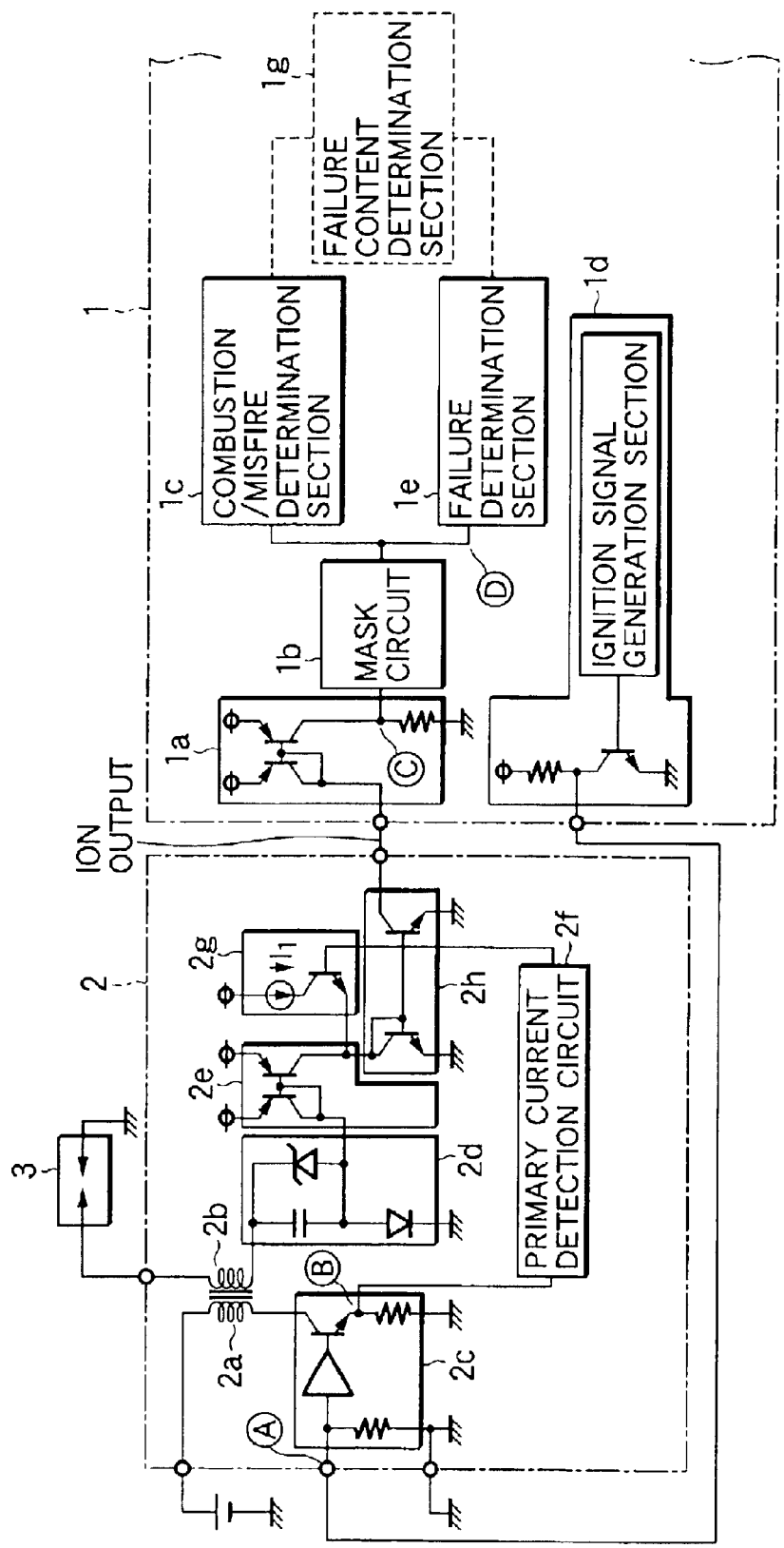
FIG. 1 is a block diagram showing a first embodiment.
Figure 2:
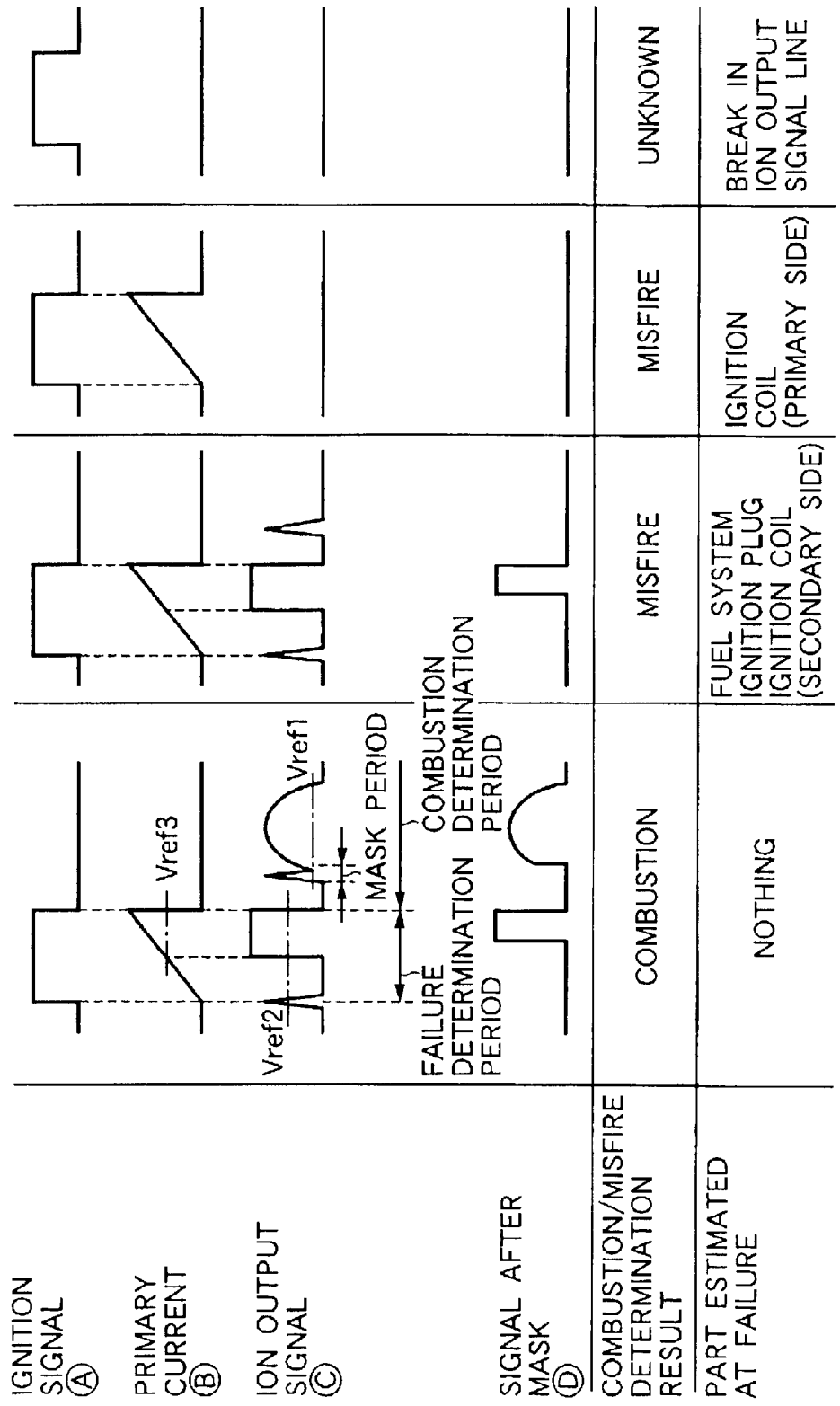
FIG. 2 is a timing chart showing the first embodiment.

FIG. 1 is a block diagram showing one embodiment of the invention. FIG. 2 is a timing chart showing an operation thereof.

Numeral 1 denotes a control unit.

Numeral 1a denotes an ion current detection circuit for converting an ion current into a voltage value, including a current mirror and a resistor for ion current detection.

Numeral 1b denotes a mask circuit for eliminating a noise signal superimposed on the ion current at a time of turning on an ignition signal and after the completion of discharge.

Numeral 1c denotes a combustion/misfire determination section for comparing a signal after mask with a predetermined reference level (Vref1) and making a combustion determination when the signal is larger than the reference level or making a misfire determination when the signal is smaller than the reference level.

Numeral 1d denotes an ignition signal generation section.

Numeral 1e denotes a failure determination section for making a determination of failure based on the signal after mask.

Numeral 1g denotes a failure content determination section.

Numeral 2 denotes an ignition coil.

Numeral 2a denotes a primary winding of the ignition coil.

Numeral 2b denotes a secondary winding of the ignition coil.

Numeral 2c denotes a drive circuit including a preamplifier, a switching element, and a primary current detection resistor.

Numeral 2d denotes a bias circuit including a capacitor for storing a bias voltage for ion current detection, a Zener diode for defining a bias voltage value, and a diode for forming a secondary current path.

Numeral 2e denotes a current mirror circuit for distributing the ion current.

Numeral 2f denotes a primary current detection circuit for detecting a period during which a primary current exceeds a predetermined level Vref3 based on a voltage drop occurring in the primary current detection resistor in the drive circuit and producing a High output (base current supply) only for the period.

Numeral 2g denotes a constant-current circuit for supplying a constant current I1 at a time when the primary current detection circuit produces the High output, and forms a failure determination signal output section along with numeral 2f.

Numeral 2h denotes a current mirror circuit for outputting a current in which the ion current and the constant current of primary current detection are added (in the embodiment, a current is pulled from the control unit) and forms an ion current detection signal output section.

Numeral 3 denotes a spark plug.

When a primary current of the predetermined level Vref3 or more flows through the primary winding of the ignition coil, the primary current detection circuit supplies a base current to the constant-current circuit. Thus, a constant current is supplied to the current mirror circuit 2h by the constant-current circuit. Also, an ion current is supplied to the current mirror circuit 2h by the current mirror circuit 2e. Therefore, a current pulled from the control unit by the current mirror circuit 2h is sum of the ion current and the constant current. An ion output signal is indicated as C shown in FIG. 2. On the contrary, the mask circuit masks an ion output signal for a predetermined period from signal occurrence and a signal after mask is indicated as shown in D. Since a failure determination signal (corresponding to the constant current flowing by primary current detection) occurs only for a period during which a primary current flows, the period is a period during which an ignition signal is High. This period is set to a failure determination period. The failure determination section makes a normal determination when an output after mask exceeds a predetermined level Vref2 or makes an abnormal determination when the output does not exceed the level Vref2. After the ignition signal shifts from High to Low, it becomes a combustion/misfire determination period. The combustion/misfire determination section makes a combustion determination when the output after mask exceeds the predetermined level Vref1 or makes an abnormal determination when the output does not exceed the level Vref1.

When an ignition operation is performed correctly and combustion is performed inside a cylinder, the signal after mask is indicated as shown in the left of FIG. 2. Signals of the predetermined levels Vref2 and Vref1 or more are identified in both of the failure determination period and the combustion determination period, so that it is checked that the primary current of the ignition coil has flowed correctly and the combustion has been performed correctly.

In a case of a signal of the second from the left of FIG. 2, a signal of Vref2 or more is identified in the failure determination period, but a signal of Vref1 or more is not identified in the combustion determination period. In this case, it is proved that the primary current of the ignition coil has flowed correctly, so that it is considered that the cause is the secondary side of the ignition coil including the spark plug or a fuel system part. Therefore, in the case of making inspection and repair, the fuel system part must be inspected when an external discharge mark is absent in the secondary side of the ignition coil and the plug is normal.

Also, in a case of a signal of the third from the left of FIG. 2, signals of the predetermined level or more are not identified in both of the failure determination period and the combustion determination period. In this case, there is a possibility that the primary current of the ignition coil has not flowed. A break in at least one of VB, GND and an ignition signal of the ignition coil or circuit failure including a primary winding drive circuit is given as the cause.

By the way, as is described in the fourth from the left of FIG. 2, also when an ion output signal line between the ignition coil and the control unit is broken, signals of the predetermined level or more are not identified in both of the failure determination period and the combustion determination period. Thus, when a failure determination of this mode is made, in a case that the presence or absence of a break in the ion output signal line is first inspected and the line is not broken, a break in at least one of VB, GND and an ignition signal of the ignition coil or circuit failure including a primary winding drive circuit must be inspected.

A determination of the failure contents as described above can be made by a failure content determination section 1g. Also, a person can made the determination based on output (display) of the combustion/misfire determination section 1c and the failure determination section 1e.

This is similar to second and third embodiments described below.

Second Embodiment

Figure 3:
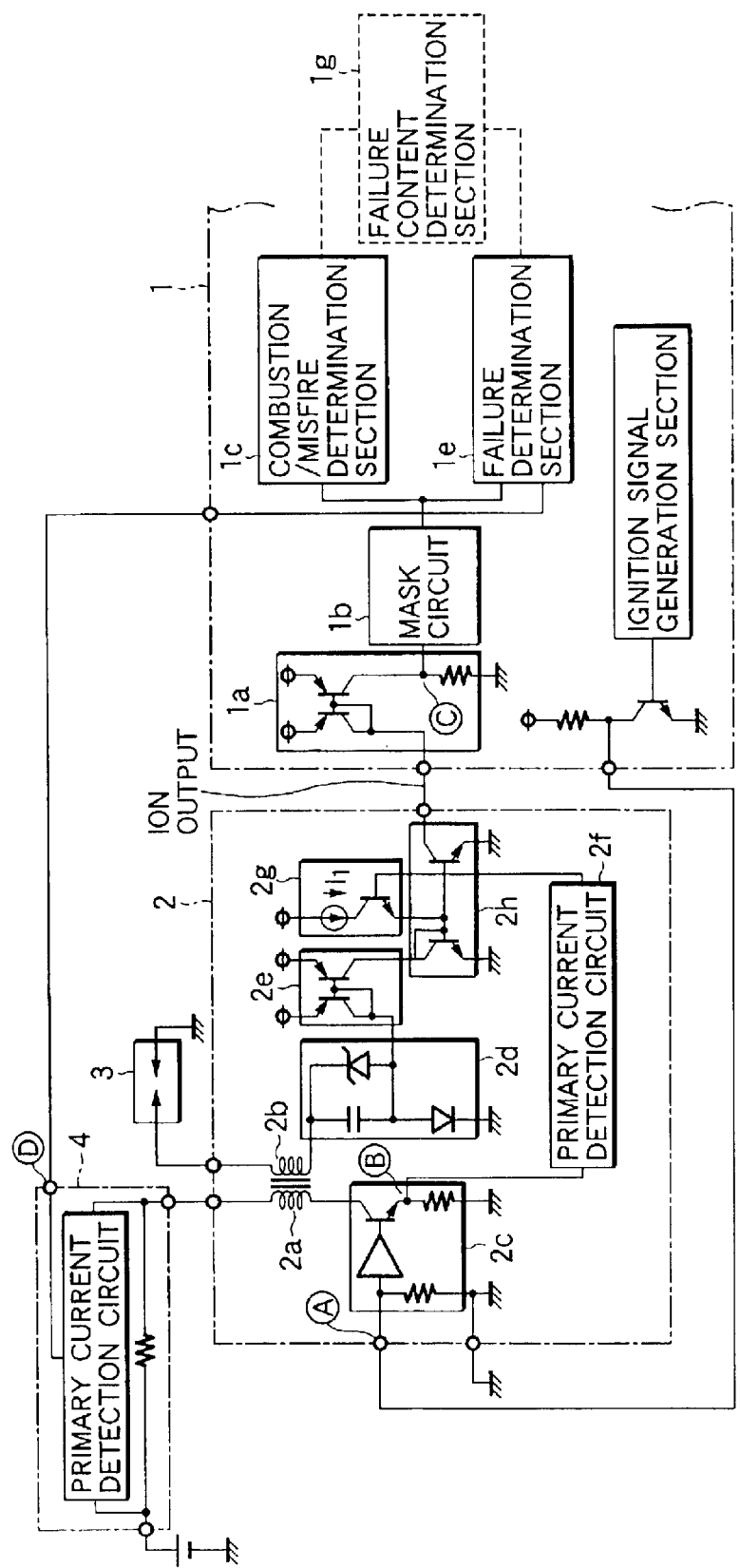
FIG. 3 is a block diagram showing a second embodiment.
Figure 4:
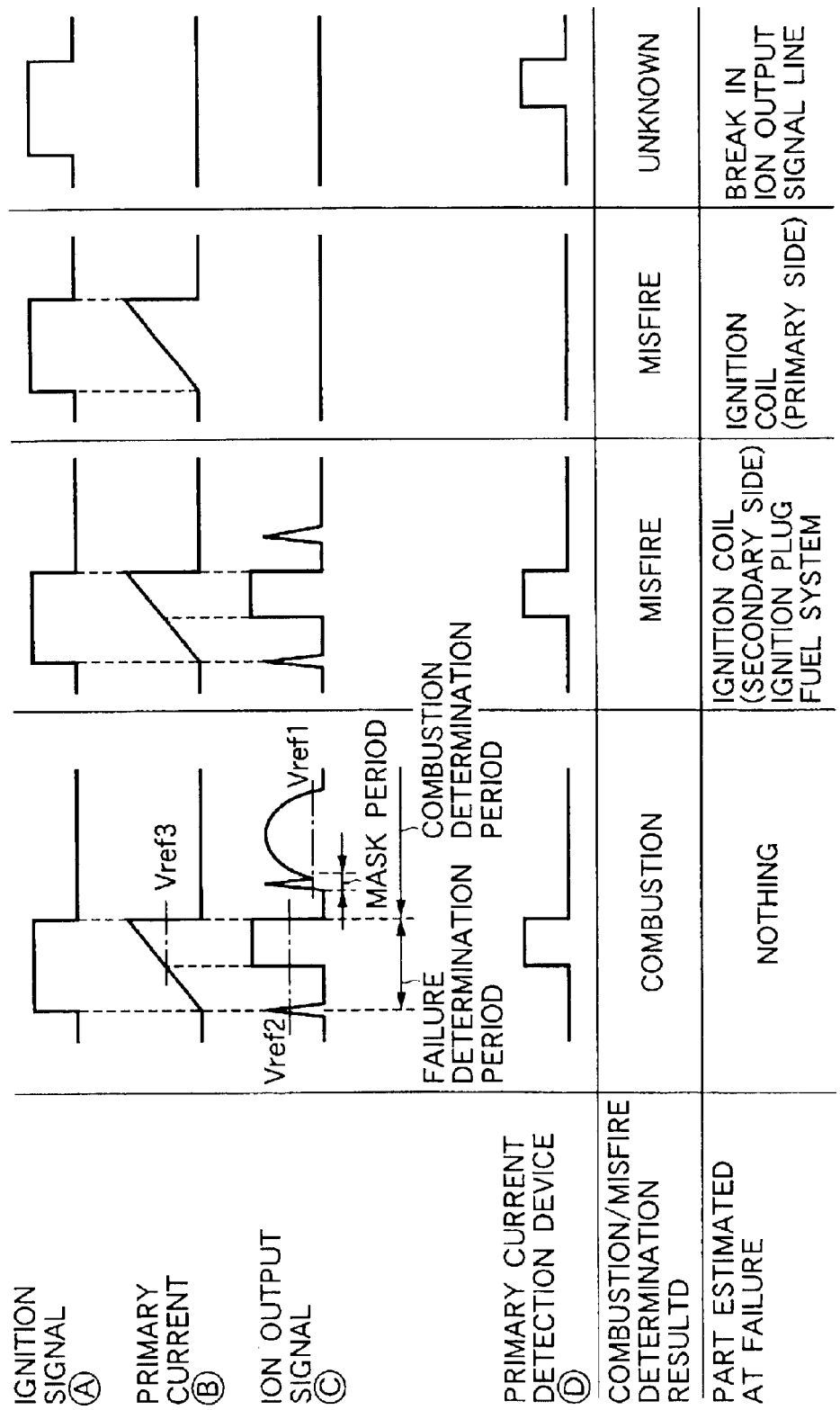
FIG. 4 is a timing chart showing the second embodiment.

FIG. 3 is a block diagram showing a second embodiment. FIG. 4 is a timing chart showing an operation thereof.

Numeral 1 denotes a control unit.

Numeral 1a denotes an ion current detection circuit for converting an ion current into a voltage value, including a current mirror and a resistor for ion current detection.

Numeral 1b denotes a mask circuit for eliminating a noise signal superimposed on the ion current at a time of turning on an ignition signal and after the completion of discharge.

Numeral 1c denotes combustion/misfire a determination section for comparing a signal after mask with a predetermined reference level (Vref1) and making a combustion determination when the signal is larger than the reference level or making a misfire determination when the signal is smaller than the reference level.

Numeral 1d denotes an ignition signal generation section.

Numeral 1e denotes a failure determination section for making a determination of failure based on the signal after mask.

Numeral 1g denotes a failure content determination section.

Numeral 2 denotes an ignition coil.

Numeral 2a denotes a primary winding of the ignition coil.

Numeral 2b denotes a secondary winding of the ignition coil.

Numeral 2c denotes a drive circuit including a preamplifier, a switching element, and a primary current detection resistor.

Numeral 2d denotes a bias circuit including a capacitor for storing a bias voltage for ion current detection, a Zener diode for defining a bias voltage value, and a diode for forming a secondary current path.

Numeral 2e denotes a current mirror circuit for distributing the ion current.

Numeral 2f denotes a primary current detection circuit for detecting a period during which a primary current exceeds a predetermined level Vref3 based on a voltage drop occurring in the primary current detection resistor in the drive circuit and producing a High output (base current supply) only for the period.

Numeral 2g denotes a constant-current circuit for supplying a constant current I1 at a time when the primary current detection circuit produces the High output.

Numeral 2h denotes a current mirror circuit for outputting a current in which the ion current and the constant current of primary current detection are added (in the embodiment, a current is pulled from the control unit).

Numeral 3 denotes a spark plug.

Numeral 4 denotes a primary current detection device connected in series with a VB line of the ignition coil. The primary current detection device includes a resistor for primary current detection, which generates a voltage drop due to a primary current, and a primary current detection circuit for determining that a primary current flows due to the voltage drop to generate a signal.

In addition to a configuration of the first embodiment, the primary current detection device is added to the VB line of the ignition coil. An output signal of the primary current detection device is indicated as shown in a signal D of FIG. 4. In the first embodiment, there is no difference between the signals after mask at a time of a break in an ion output signal line and at a time of a break in at least one of VB, GND and an ignition signal of the ignition coil or circuit failure including a primary winding drive circuit. Therefore, the cause of failure cannot be identified. On the other hand, in the second embodiment, by adding the primary current detection device, the cause can be identified as a break in an ion output signal when the output signal of the primary current detection device is present. The cause can be identified as a break in at least one of VB, GND and an ignition signal of the ignition coil or circuit failure including a primary winding drive circuit when the output signal is absent.

Third Embodiment

Figure 5:
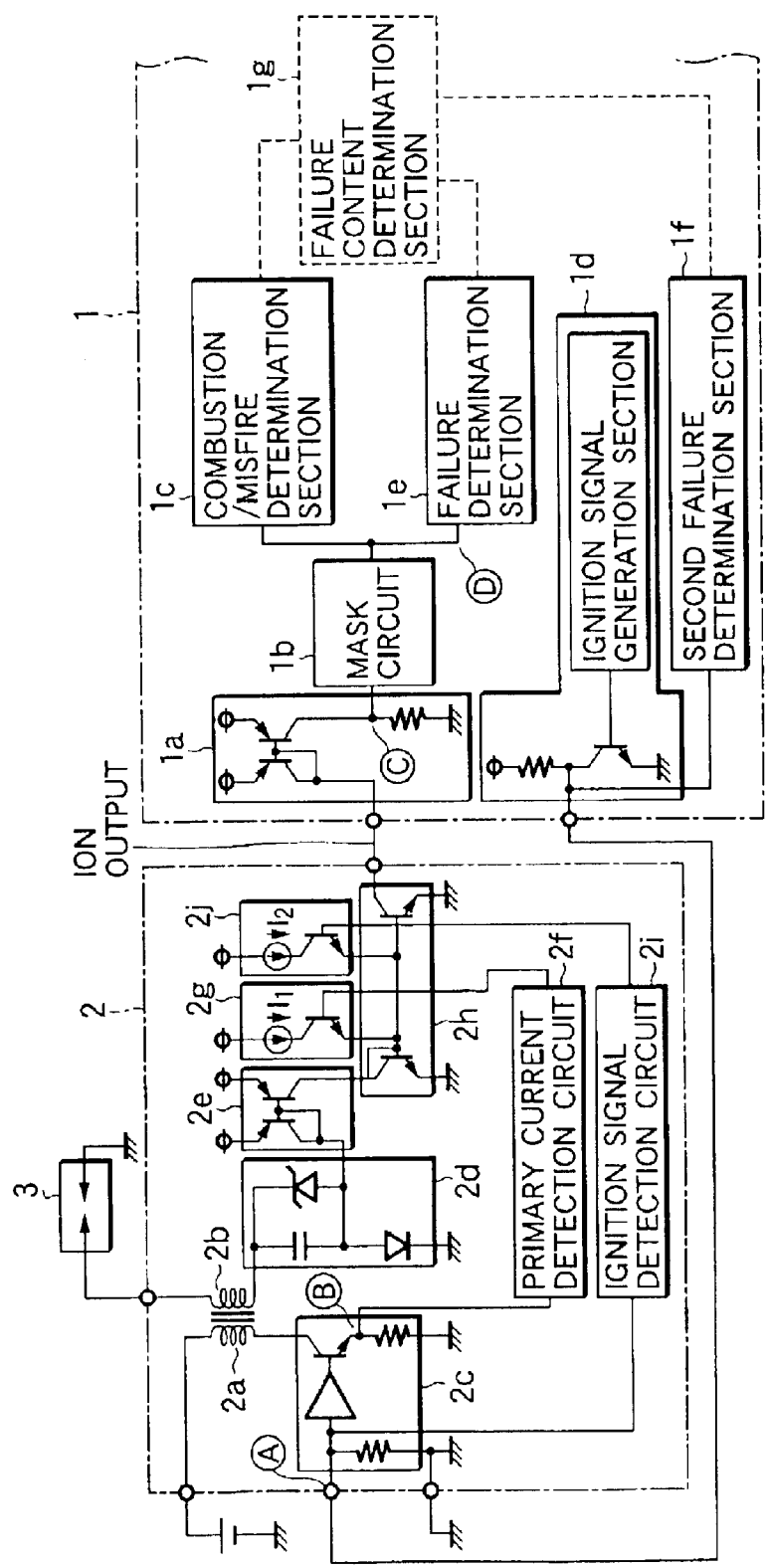
FIG. 5 is a block diagram showing a third embodiment.
Figure 6:
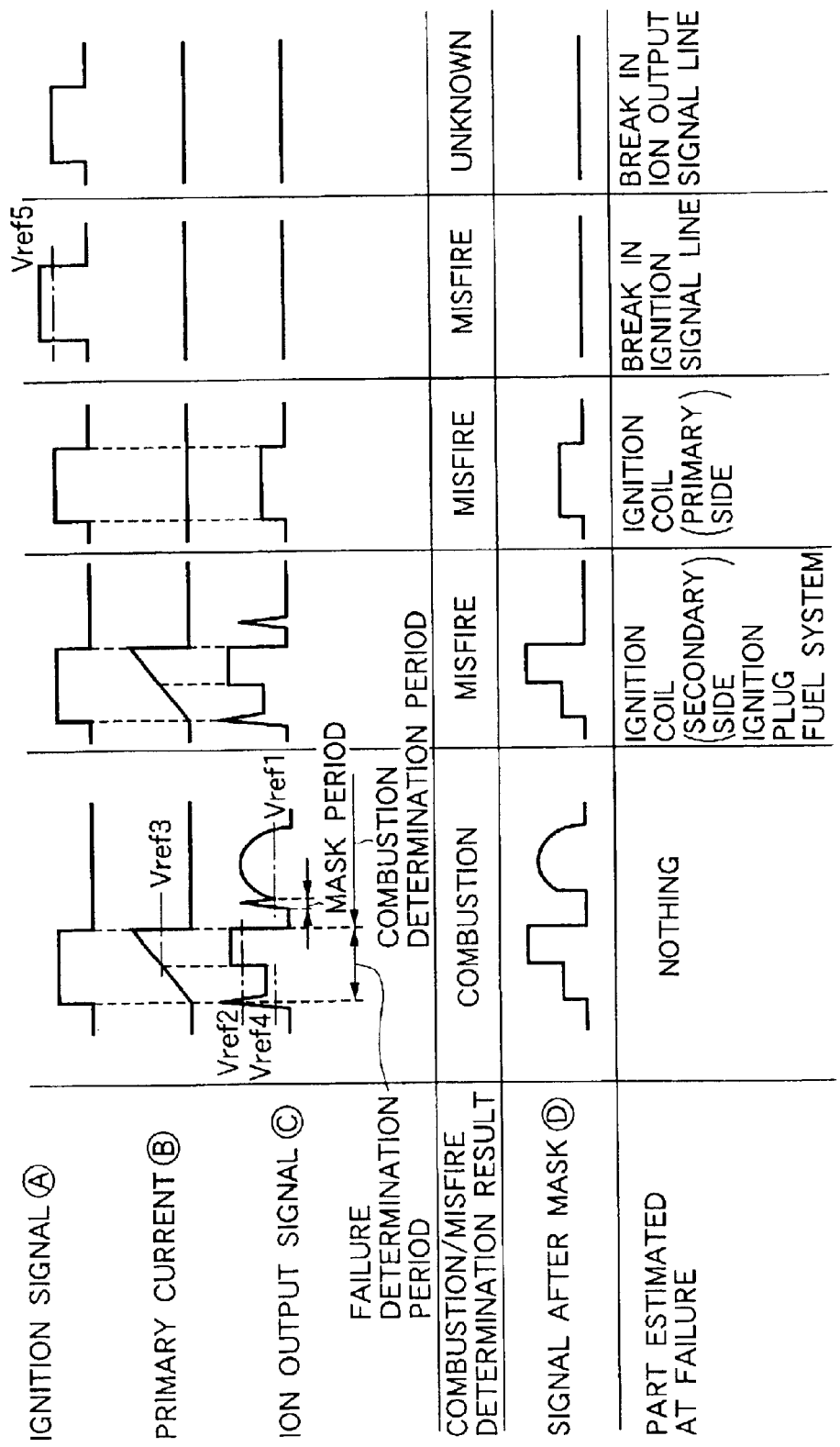
FIG. 6 is a timing chart showing the third embodiment.
Figure 7:
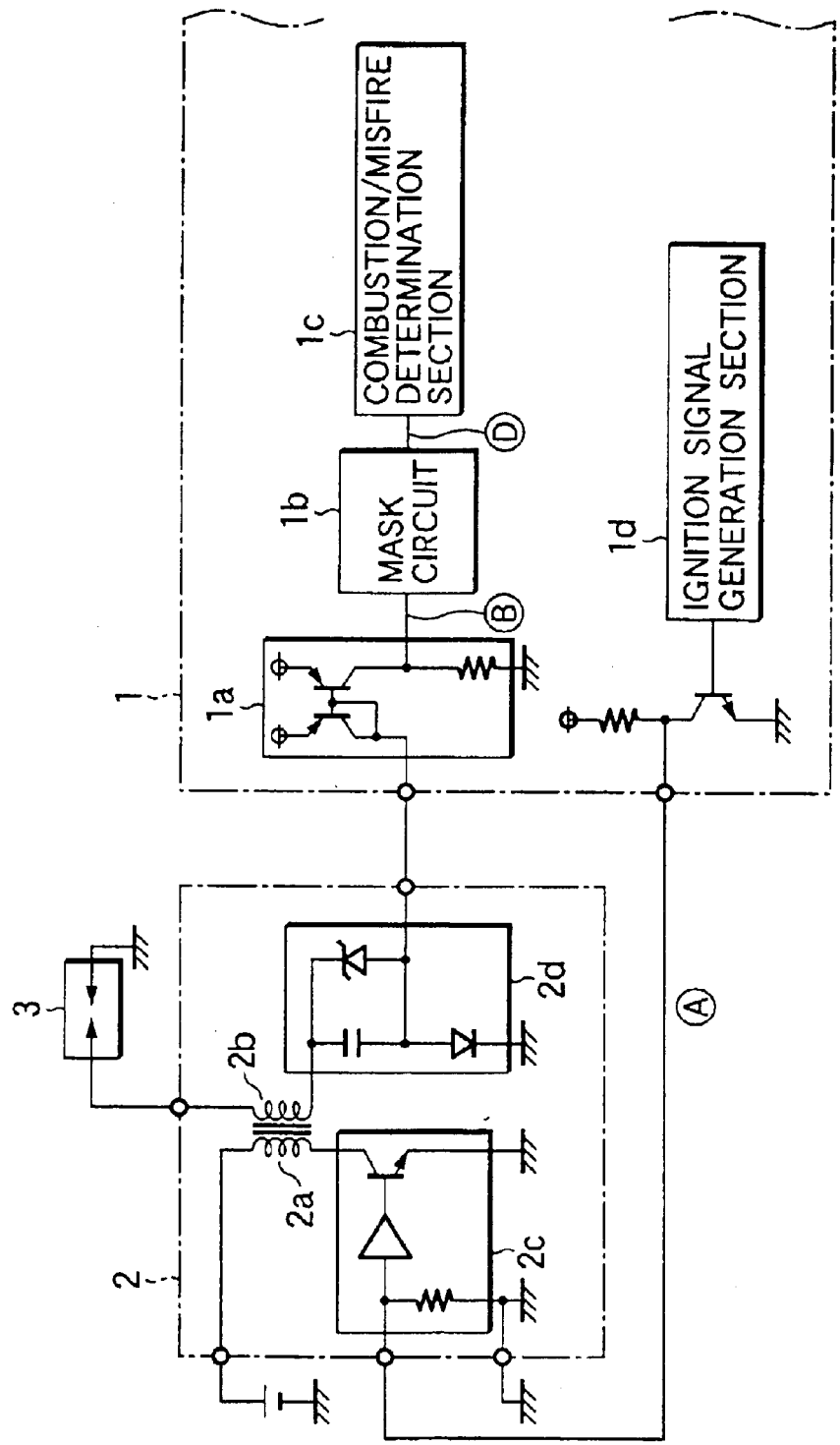
FIG. 7 is a block diagram showing a conventional apparatus.

FIG. 5 is a block diagram showing a third embodiment. FIG. 6 is a timing chart showing an operation thereof.

Numeral 1 denotes a control unit.

Numeral 1a denotes an ion current detection circuit for converting an ion current into a voltage value, including a current mirror and a resistor for ion current detection.

Numeral 1b denotes a mask circuit for eliminating a noise signal superimposed on the ion current at the time of turning on an ignition signal and after the completion of discharge.

Numeral 1c denotes combustion/misfire determination section for comparing a signal after mask with a predetermined reference level (Vref1) and making a combustion determination when the signal is larger than the reference level or making a misfire determination when the signal is smaller than the reference level.

Numeral 1d denotes ignition signal generation section.

Numeral 1e denotes a failure determination section for making a determination of failure based on the signal after mask.

Numeral 1f denotes a failure determination section for determining the presence or absence of failure of ignition signal wiring.

Numeral 1g denotes a failure content determination section.

Numeral 2 denotes an ignition coil.

Numeral 2a denotes a primary winding of the ignition coil.

Numeral 2b denotes a secondary winding of the ignition coil.

Numeral 2c denotes a drive circuit including a preamplifier, a switching element and a primary current detection resistor.

Numeral 2d denotes a bias circuit including a capacitor for storing a bias voltage for ion current detection, a Zener diode for defining a bias voltage value and a diode for forming a secondary current path.

Numeral 2e denotes a current mirror circuit for distributing the ion current.

Numeral 2f denotes a primary current detection circuit for detecting a period during which a primary current exceeds a predetermined level Vref3 based on a voltage drop occurring in the primary current detection resistor in the drive circuit and producing a High output (base current supply) only for the period.

Numeral 2g denotes a constant-current circuit for supplying a constant current I1 at a time when the primary current detection circuit produces the High output.

Numeral 2h denotes a current mirror circuit for outputting a current in which the ion current and the constant current of primary current detection are added (in the embodiment, a current is pulled from the control unit).

Numeral 2i denotes an ignition signal detection circuit for producing a High output (base current supply) for a period during which an ignition signal is a High level.

Numeral 2j is a constant-current circuit for supplying a constant current I2 at a time when the ignition signal detection circuit produces the High output.

Numeral 3 is a spark plug. Numeral 4 denotes a primary current detection device connected in series with a VB line of the ignition coil. The primary current detection device includes a resistor for primary current detection, which generates a voltage drop due to a primary current, and a primary current detection circuit for determining that a primary current flows due to the voltage drop to generate a signal.

In addition to a configuration of the first embodiment, the failure determination section is added to the control unit and the ignition signal detection section and the constant-current circuit are added to the ignition coil.

The failure determination section in the control unit is specifically an A/D converter. It is configured that a processor determines whether or not a High level of an ignition signal decided by a pull-up resistor in the ignition signal generation section and a pull-down resistor in the ignition coil drive circuit is a normal voltage level by an A/D conversion result. However, in a case of implementing this configuration, it is required that there is a small potential difference between GNDs of the control unit and the ignition coil.

The ignition signal detection section in the coil operates the constant-current circuit for a period during which an ignition signal is a High level and the constant current I2 occurs in an ion output signal of FIG. 6.

The leftmost signal of FIG. 6 is a case in which ignition is performed normally and combustion is performed normally. A signal in excess of Vref4 occurs for a period during which the ignition signal is High and a signal of Vref2 or more occurs in the later half of the ignition signal in which the primary current becomes high. Therefore, it is found that an ignition signal has been correctly transmitted to the drive circuit in the ignition coil and a primary current has flowed correctly. Also, an ion current of Vref1 or more occurs for a combustion determination period. Therefore, it is found that the combustion has been performed correctly.

In a case of a signal of the second from the left of FIG. 6, a signal of Vref4 or more is identified in a failure determination period and a signal of Vref2 or more is identified in the later half of the ignition signal in which the primary current becomes high. However, a signal of Vref1 or more is not identified in the combustion determination period. In this case, it is proved that the ignition signal has been correctly transmitted to the ignition coil and the primary current has flowed correctly. Thus, it is considered that the cause is the secondary side of the ignition coil including the spark plug or a fuel system part. Therefore, in a case of making inspection and repair, the fuel system part must be inspected when an external discharge mark is absent in the secondary side of the ignition coil and the plug is normal.

Also, in a case of a signal of the third from the left of FIG. 6, the signal of Vref4 or more is identified in the failure determination period. However, a signal in excess of Vref2 cannot be identified and also the signal of Vref1 or more is not identified in the combustion determination period. In this case, the ignition signal has been correctly transmitted to the ignition coil but the primary current has not flowed. A break in at least one of VB, GND and an ignition signal of the ignition coil or circuit failure including a primary winding drive circuit is given as the cause.

In a case of a signal of the fourth from the left of FIG. 6, signals of a predetermined level or more are not identified in both of the failure determination period and the combustion determination period and a High level of the ignition signal becomes Vref5 or more. Therefore, a break in an ignition signal line can be identified as the cause.

In a case of a signal of the fifth from the left of FIG. 6, signals of a predetermined level or more are not identified in both of the failure determination period and the combustion determination period and the High level of the ignition signal becomes less than Vref5. Therefore, a break in an ion output signal line can be identified as the cause.

What is claimed is:

1. A combustion state detection apparatus of an internal combustion engine, comprising:

an ignition coil; and a control unit, wherein the ignition coil comprises:

an ignition coil primary current switching section;

an ion current detection section which detects an ion current output from the ignition coil primary current switching section;

a failure determination signal output section which outputs a failure determination signal of an ignition operation of the internal combustion engine; and an ion current detection signal output section which outputs an ion current detection signal, wherein the ion current detection signal includes the ion current detected by the ion current detection section and the failure determination signal output from the failure determination signal output section, wherein the control unit comprises:

a combustion state detection section which detects a combustion state of the internal combustion engine based on the ion current detection signal output from the ion current detection signal output section of the ignition coil; and a failure determination section which also receives the ion current detection signal output from the ion current detection signal output section of the ignition coil, and determines failure of the ignition coil based on the ion current detection signal.

2. The combustion state detection apparatus according to claim 1, wherein the failure determination signal is outputted when the failure determination signal output section detects that a primary current of a predetermined value or more, flows through a primary winding of the ignition coil.

3. The combustion state detection apparatus according to claim 1, wherein the failure determination signal is output when an ignition signal is detected.

4. The combustion state detection apparatus according to claim 1, wherein the failure determination signal is a combination of a first failure determination signal, which is output by detecting a primary current of the ignition coil, and a second failure determination signal, which is output by detecting an ignition signal; and wherein an output level of the first failure determination signal is set larger than an output level of the second failure determination signal.

5. The combustion state detection apparatus according to claim 2, wherein an output level of the failure determination signal is set larger than an output level of the ion current.

6. The combustion state detection apparatus according to claim 2, further comprising a second failure determination signal output section which detects a primary current, wherein an output signal of the second failure determination signal output section is input to the failure determination section.

7. The combustion state detection apparatus according to claim 1, wherein the ignition coil, the ignition coil primary current switching section, the ion current detection section, the failure determination signal output section, and the ion current detection signal output section are built into one package.

8. The combustion state detection apparatus according to claim 1,
wherein a detection period switching timing is set in a range from an ignition timing to start of an ion current occurrence;
wherein the failure determination section determines failure of the ignition coil based on the ion current detection signal after start of an ignition coil energization and before the detection period switching timing; and
wherein the combustion state detection section detects the combustion state of the internal combustion engine based on the ion current detection signal in a predetermined time after the detection period switching timing.

9. A combustion state detection apparatus of an internal combustion engine, comprising:
an ignition coil; and
a control unit,
wherein the ignition coil comprises:
an ignition coil primary current switching section;
an ion current detection section which detects an ion current output from the ignition coil primary current switching section;
a failure determination signal output section which outputs a failure determination signal of an ignition operation of the internal combustion engine;
an ion current detection signal output section which outputs an ion current detection signal, wherein the ion current detection signal includes the ion current detected by the ion current detection section and the failure determination signal output from the failure determination signal output section; and
a second failure determination signal output section which outputs a second failure determination signal of an ignition operation of the internal combustion engine, wherein the control unit comprises:
a combustion state detection section which detects a combustion state of the internal combustion engine based on the ion current detection signal output from the ion current detection signal output section of the ignition coil;
a failure determination section which also receives the ion current detection signal output from the ion current detection signal output section of the ignition coil, and determines failure of the ignition coil based on the ion current detection signal; and
a second failure determination section which receives the second failure determination signal from the second failure determination signal output section and determines failure of the ignition coil based on the second failure determination signal.

10. The combustion state detection apparatus according to claim 9, wherein the second failure determination signal is outputted when the second failure determination signal output section detects that a primary current of a predetermined value or more, flows through a primary winding of the ignition coil.

* * * * *